Dec. 29, 1925.
J. BUCHLI
BOGIE OF VEHICLES RUNNING ON RAILS
Filed August 29, 1924
1,567,569
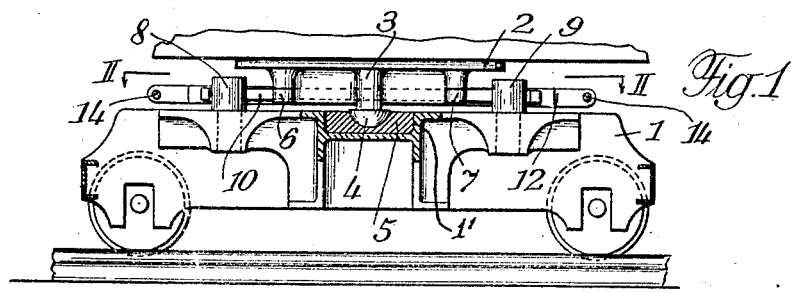
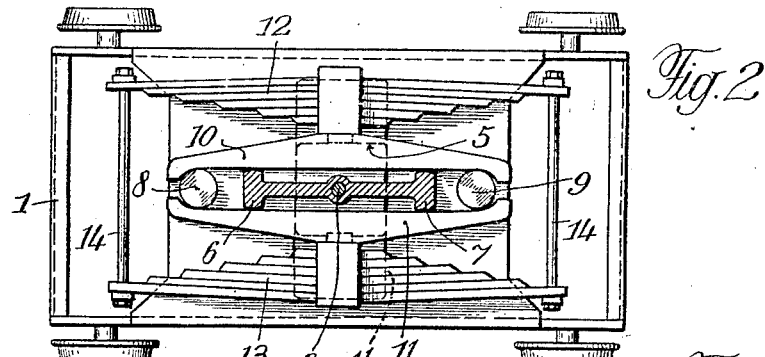
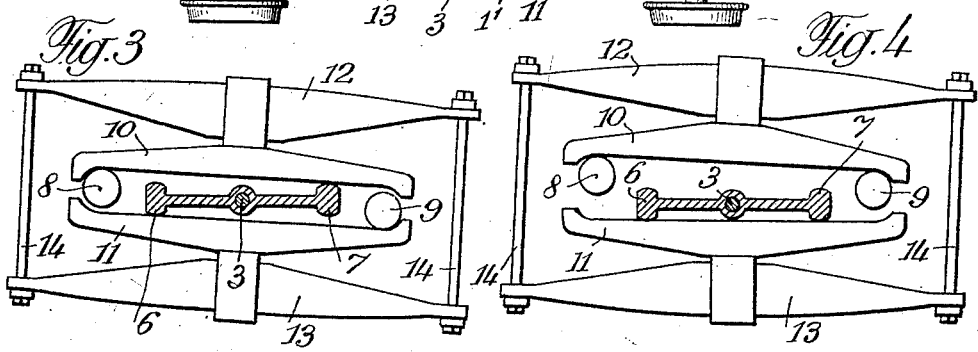
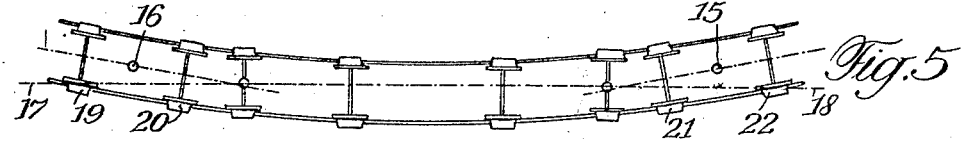
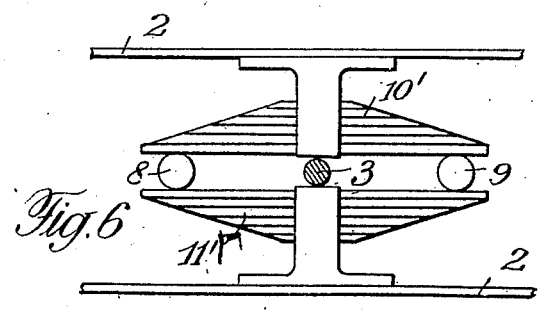
Inventor
Jakob Buchli,
By Henry Ort
Atty Patented Dec. 29, 1925.

1,567,569

UNITED STATES PATENT OFFICE.

JAKOB BUCHLI, OF WINTERTHUR, SWITZERLAND, ASSIGNOR TO THE FIRM SWISS LOCOMOTIVE AND MACHINE WORKS, OF WINTERTHUR, SWITZERLAND.

BOGIE OF VEHICLES RUNNING ON RAILS.

Application filed August 29, 1924. Serial No. 734,916.

*To all whom it may concern:*

Be it known that I, JAKOB BUCHLI, a citizen of the Republic of Switzerland, residing at Winterthur, Switzerland, have invented certain new and useful Improvements in Bogies of Vehicles Running on Rails, of which the following is a specification, reference being had therein to the accompanying drawing.

The present invention has reference to improvements in bogies of vehicles running on rails at high running speeds. Every bogie of a vehicle running on rails tends to hunt when the vehicle travels along a straight stretch owing to the conical shape of the tire, that is to say every set of wheels of a bogie performs periodically a to and fro movement in the transverse direction and the extent of this movement is limited by the play between flange and rail. The respective movements of two sets of wheels provided in one bogie are in opposition to each other as the bogie is turnable about a pivot pin arranged intermediate of the two sets of wheels and fixed to the main frame of the vehicle. These hunting movements cause periodically transverse forces acting on the rails and on the pivot and these forces increase with an increasing running speed of the vehicle; these forces may prevent in a considerable degree the smooth running of a vehicle. When negotiating curves the hunting movements disappear, particularly at high running speeds, as in this case the flanges of the tires are pressed against the outer rail. The hunting movements occurring when the vehicle travels over straight stretches may be prevented or dampened by an arrangement which continuously tends to return the bogie which oscillates about its pivot into the vertical central plane of the vehicle. These turning forces tending to return the bogie into its mid-position, however, disappear as soon as, besides the turning motion about the pivot, a lateral translation movement of the longitudinal axis of the bogie relatively to the longitudinal axis of the vehicle occurs. This latter condition must be complied with in order to prevent an additional flange pressure of the leading flange, tending to lower the safety against de-railing when the bogie negotiates a curve.

The bogie according to the present condition fulfills the above conditions and it shows the feature that resilient intermediate members are interposed in the connecting means between the bogie and the vehicle frame, said members bearing against projections provided in pairs on at least one of said two parts, i. e., on the bogie and on the frame, these projections being arranged in the direction of the rails and in front of and behind the pivot pin respectively.

A constructional example of the bogie according to the present invention is illustrated on the accompanying drawings, in which:

Fig. 1 is a side elevation of the bogie,

Fig. 2 is a section along line II—II in Fig. 1 showing the projections provided in the bogie and in the vehicle frame and the two resilient intermediate members in their mid-position, Fig. 3 is a diagrammatic plan view of the respective positions of the parts when a turning motion of the bogie about its pivot has occurred, Fig. 4 is a diagrammatic plan view similar to Fig. 3 and showing the respective positions of the parts when the bogie has been simultaneously turned and shifted in the lateral direction, Fig. 5 illustrates in a diagrammatic manner the position of the sets of wheels of a vehicle having bogies at both ends and negotiating a curve.

Fig. 6 shows schematically a modified embodiment.

Referring now to the constructional example illustrated in Figs. 1 and 2, 1 denotes the frame of the bogie and 2 is a portion of the vehicle frame. The pivot pin 3 fixed to the frame 2 is provided with a spherical head 4 cooperating with a correspondingly shaped seat 5 capable of lateral movement relatively to the frame 1 of the bogie by sliding along the channel-shaped part 1' of the frame 1. In front of and behind the pivot pin 3 projections 6 and 7 respectively are provided and rigidly fixed to the vehicle frame 2 and projections 8 and 9 respectively are rigidly fixed to or integral with the frame 1 of the bogie. The projections 6, 7 and 8, 9 are arranged in pairs in the longitudinal direction of the vehicle at both sides of the pivot 3 and members 10 and 11 are pressed by the action of the laminated plate springs 12 and 13 laterally against said projections. The plate springs 12 and 13 are connected to each other at their ends by the rods 14 as is shown in Fig. 2. When the vehicle travels along a straight stretch and a hunting movement of the sets of wheels occurs the projections 8 and 9 of the bogie carry out a turning motion about the pivot 3 as fulcrum, so that the plane passing through the projections 6 and 7, which plane is the longitudinal centre plane of the vehicle, forms an angle with the plane passing through the projections 8 and 9 as is shown in Fig. 3. The members 10 and 11 then abut against the projections 7 and 8 and 6 and 9 respectively so that the springs 12 and 13 acting on the projections 9 and 8 generate forces which tend to return the bogie into its mid-position. In this manner the hunting movement of the bogie occurring when the vehicle travels over a straight stretch are prevented or at least effectively dampened.

When the vehicle negotiates a curve the centres 15 and 16 of the bogies are shifted in a lateral direction relatively to the centre plane 17, 18 of the vehicle as may be seen in Fig. 5. The projections 6 and 7 fixed to the vehicle frame 1 and the projections 8 and 9 fixed to the frame of the bogie are then in the positions illustrated in Fig. 4. The member 10 now abuts against the pair of projections 8 and 9 fixed to the bogie while the pair of projections 6 and 7 fixed to the vehicle frame are completely out of engagement with the member 10 and displace the member 11 in the lateral direction so that the latter is out of engagement with the projections 8 and 9 of the bogie. In these relative positions of the members 10 and 11 and of the projections no turning movement is effected on the bogie but there exists a force tending to return the centre of the bogie into the centre plane of the vehicle. As may be seen in Fig. 5 the two outer flanges of each bogie 19, 20 and 21, 22 respectively bear against the outer rail when travelling through a curve so that a hunting movement of a bogie is prevented. The exertion of a force carrying out a turning action on the bogie is therefore not necessary and has to be avoided in the present case as it would unduly increase the pressure already present between the outer flanges and the rail and likewise the danger of causing a derailing of the bogie. The only force caused is a force acting at right angles to the direction of the rails and effecting the return movement of the bogie into the centre plane of the vehicle as soon as the latter starts to travel along a straight stretch.

The above described embodiment of the invention is given by way of example and many modifications may suggest themselves in the arrangement and the interconnection of the various parts. For instance, the projections on one of the two parts, i. e., the bogie or the vehicle frame, and the resilient intermediate member may be built to form a unitary structure. A constructional form of this type is illustrated in Fig. 6. The projections 8 and 9 arranged in front of and behind the pivot 3 respectively are in cooperation with the two plate springs 10' and 11', fixed to the vehicle frame and acting at the same time as the projections 6 and 7 of the above described example. This embodiment works in an exactly similar manner to that described with the first constructional example.

I claim:

1. In a vehicle running on rails and particularly at high speeds, a vehicle frame, a bogie having a frame, and means adapted to operatively connect the frame of said bogie to the frame of said vehicle and including a pivot connection permitting of a lateral movement of the bogie relatively to the frame, projecting parts provided on at least one of said frames and arranged in pairs whereby one projection of a pair is in front of and the other behind the pivot, and resilient means adapted to cooperate with said projections, so that a turning moment is generated by said resilient means causing a return of the bogie into its mid-position when the latter has carried out a turning movement and that the turning moment disappears when the bogie has been shifted transversely besides carrying out a turning movement.

2. In a vehicle running on rails and particularly at high speeds, a vehicle frame, a bogie having a frame, and means adapted to operatively connect the frame of said bogie to the frame of said vehicle and including a pivot connection capable of a lateral movement relatively to the bogie, projecting parts provided on said frames and arranged in pairs whereby one projection of each pair is in front of and the other behind the pivot, and resilient means adapted to cooperate with said projections in the transverse directions of the vehicle, so that a turning moment is generated by said resilient means causing a return of the bogie into its mid-position when the latter has carried out a turning movement and that the turning moment disappears when the bogie has been shifted transversely besides carrying out a turning movement.

3. In a vehicle running on rails and particularly at high speeds, a vehicle frame, a bogie having a frame, and means adapted to operatively connect the frame of said bogie to the frame of said vehicle and including a pivot connection capable of a lateral movement relatively to the bogie, projecting parts provided on said frames and arranged in pairs whereby one projection of each pair is in front of and the other behind the pivot, and plate springs adapted to cooperate with said projections in the transverse directions of the vehicle so that a turning moment is generated by said plate springs causing a return of the bogie into its mid-position when the latter has carried out a turning movement and that the turning moment disappears when the bogie has been shifted transversely besides carrying out a turning movement.

4. The combination with the frame of a rail vehicle and a bogie frame therefor; of pivot means connecting the frames to permit of their relative lateral movement, springs on one of said frames, means on each of said frames at opposite sides of the pivot means arranged to cooperate with said springs to prevent the bogie from hunting.

In testimony whereof I affix my signature.

JAKOB BUCHLI.